April 1, 1924.　　　　　　　　　　　　　　1,488,845
J. G. SWAIN
METHOD AND APPARATUS FOR THE MANUFACTURE OF WHEELS
Filed Feb. 3, 1921　　　2 Sheets-Sheet 1
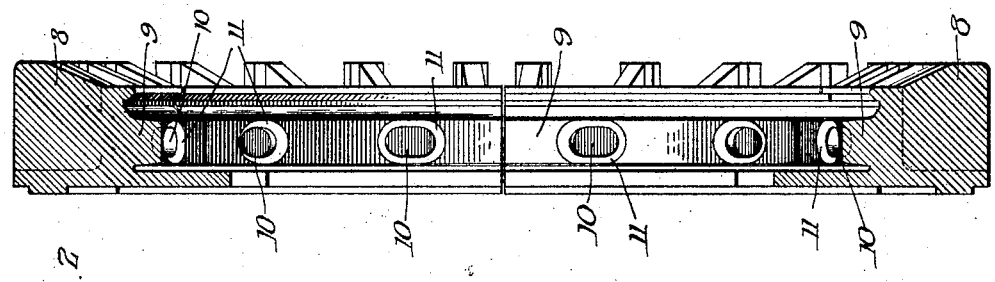
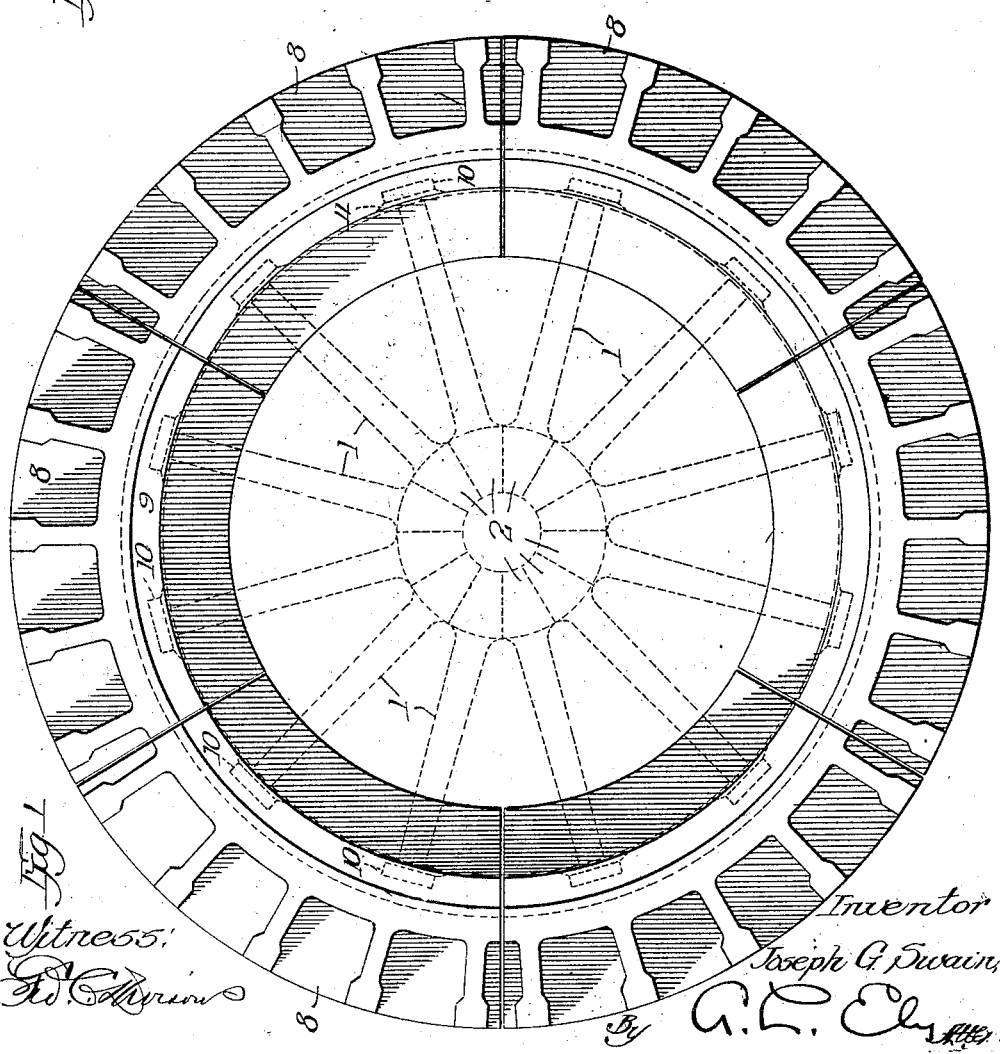

April 1, 1924.
J. G. SWAIN
1,488,845
METHOD AND APPARATUS FOR THE MANUFACTURE OF WHEELS
Filed Feb. 3, 1921   2 Sheets-Sheet 2
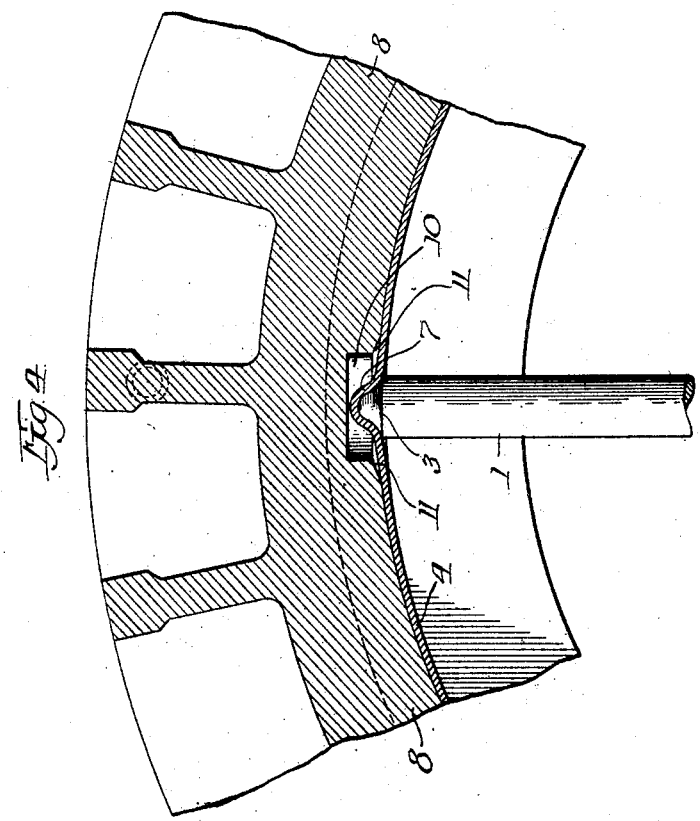
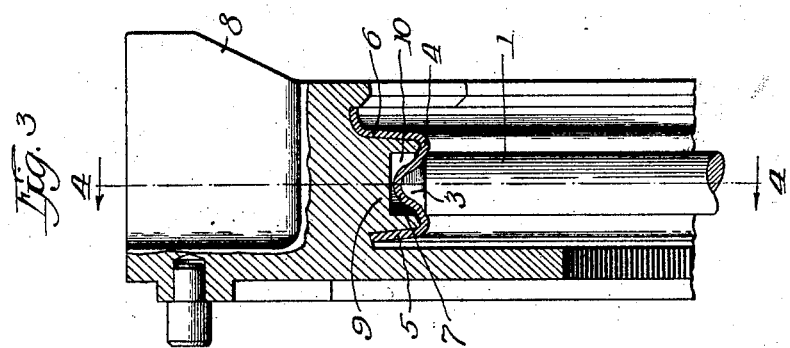
Witness:
Inventor:
Joseph G. Swain Patented Apr. 1, 1924.

1,488,845

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

METHOD AND APPARATUS FOR THE MANUFACTURE OF WHEELS.

Application filed February 3, 1921. Serial No. 442,085.

*To all whom it may concern:*

Be it known that I, JOSEPH G. SWAIN, a citizen of the United States, residing at Akron, in the county of Summit and State of Ohio, have invented certain new and useful Improvements in Methods and Apparatus for the Manufacture of Wheels, of which the following is a specification.

This invention relates to the manufacture of wheels of the type which comprise a plurality of wooden spokes radiating from the hub of the wheel, the inner or butt ends of the spokes being preferably mitered or wedge shaped to form the hub of the wheel in the manner well known in the art as the artillery type of wheel. The outer ends of the spokes are formed with projections or tenons which fit into recesses in a metallic felloe-band or fixed rim.

The type of wheel to which this invention refers may be made by shaping and circling the felloe-band from strip steel by cold rolling, the band being usually formed in U shape, the flanges serving as seats for the demountable rim, although the particular means used for carrying the resilient tire is not essential to this invention.

The felloe-band is formed into a circle longer than the finished circumference, either by originally rolling it to this size or by expanding after rolling. In the base of the felloe-band or fixed rim there are then punched outwardly a number of cup-shaped recesses which are designed to fit the tenons on the spoke ends. The felloe band and the spokes are then assembled, the tenons being seated in the recesses and the ends of the spokes being placed at the hub of the wheel. The assembled felloe band and spokes are then placed in a tire setter or similar machine and pressure exerted by the tire setter upon the felloe-band which forces all of the spokes inwardly towards the hub of the wheel and seats the tenons on the spokes in the recesses in the felloe-band.

As a result of the operations described, a firm, compact wheel structure is formed, the wedge ends of the spokes in a wheel of the artillery type are compacted together and the tenon ends are firmly compressed into the recesses in the felloe-band.

This invention relates particularly to the squeezing down or contracting process and to the apparatus for carrying out the process and is designed to form a strong and compact wheel which will withstand the strain of use to which the wheel is subjected.

While a particular type of wheel is shown it is evident that the process and apparatus are not necessarily confined to this type of wheel but may be used with wheels of other types. Furthermore, details of the operation and apparatus may be varied without departing from the invention or sacrificing any of its benefits.

In the drawings—

Fig. 1 is a plan view of the tire setter with an assembled wheel structure shown in dotted outlines.

Fig. 2 is a section through the tire setter.

Fig. 3 is an enlarged section, through one of the tire setter shoes at the spoke end, showing the manner in which the spoke end seats in the recess.

Fig. 4 is a section in the line 4—4 of Fig. 3.

In the drawing 1 represents the spokes, of which 2 are the wedge shaped inner mitered or butt ends, which together form the hub of the wheel, 3 are the reduced projecting ends or tenons of the spokes and while they are shown as rounded, such particular form is not essential. The steel felloe-band or fixed rim is shown at 4, the form shown herein being provided with two outstanding flanges 5 and 6, which provide seats for the demountable rim, if such be contemplated, although the invention is capable of use in the manufacture of a wheel structure which does not include a demountable rim.

7 are the cups or recesses which are formed in the base of the fixed rim, these recesses being preferably made by pressing them into the base of the fixed rim, although this construction may be varied.

A series of tire shoes are indicated by the numeral 8, the shoes being arranged so as to form a complete circle about the wheel and being designed to be placed in any suitable or well known form of apparatus for squeezing down or contracting the fixed rim upon the spoke ends. The inner faces of the tire setter shoes are shaped to conform to the cross section of the rim, being provided with a rib 9 which fits into the rim. In the face of the rim are formed a number of sockets or recesses 10 corresponding to the number of spokes. These seats are formed deep enough to accommodate the spoke ends as shown in Fig. 4, without contacting the ends of the spokes and they are oval shaped so as to be spaced from the spoke a sufficient distance to carry out the purposes of this invention. Around the edge of the recesses are provided tapered or beveled surfaces 11, which serve to reduce the sharpness of the bend which is given to the metal of the felloe-band.

The operation of the apparatus which has been described may be set forth briefly as follows:—

The steel fixed rim and the spokes are assembled, with the tenons seated in the recesses in the fixed rim and with the wedge shaped butt ends in fixed relation to form the hub as shown in Fig. 1. The assembly is then placed in the tire setter with each spoke end in its recess 10, and the tire setter shoes are moved inwardly by any suitable means. The inward movement of the tire shoes serves to force the butt ends of the spokes tightly together to form the hub, and the recesses 10 allow the metal about the spoke ends to give outwardly slightly. As a result of this operation the metal around the spoke ends is placed under tension which gives several beneficial results. The pressure in the butt ends of the spokes is relieved to a certain extent so that, while sufficient pressure is obtained to compact the ends of the spokes, the pressure will not be so great as to crush them. As the metal about the spoke ends is forced outwardly from its original circular position, the tension of the metal serves to maintain the compactness of the wheel. The space between the spoke ends and the tire setter shoe allows the projecting tenon to seat accurately in the depression in the rim.

These beneficial results are obtained by squeezing down or contracting the circumference of the wheel and at the same time relieving the pressure on the metal about the spoke ends, so that it may be distorted slightly, thus placing the metal at this point under tension.

The form or proportion of the various parts may be varied as circumstances require and the invention is not limited to details but is capable of embodiment in other forms. The process is not limited to the manufacture of a felloe-band of the form shown, nor to the manufacture of wheels provided with wooden spokes, although it operates to advantage on this type of wheel. The tenons and tenon seats may be changed, it not being necessary to have closed cups in order to practice the invention.

I claim:

1. A method of manufacturing wheels, comprising the steps of forming a fixed rim larger than its finished circumference, forming recesses in the fixed rim, assembling a plurality of spokes with their butt ends in contact to form the hub and with projecting ends seated in the recesses and exerting pressure inwardly on the fixed rim to force the spokes together to form the hub, and to force the projecting ends in the recesses, the pressure being applied all about the fixed rim except at the spoke ends.

2. A method of manufacturing wheels which comprise a plurality of spokes and a fixed rim, the spokes being provided with projecting tenons seated in recesses in the rim, comprising contracting the rim upon the spoke ends by pressure applied about the circumference of the fixed rim, except at the ends of the spokes, at which points no contracting pressure is exerted, so that the rim about the spoke ends is placed under tension.

3. A method of manufacturing wheels which comprise a plurality of spokes and a fixed rim, the spoke ends seating in recesses in the fixed rim, comprising contracting the rim upon the spokes by pressure applied about the circumference of the rim and relieving the contracting pressure in the vicinity of the spoke ends.

4. A method of manufacturing wheels which comprise a plurality of spokes and a fixed rim, the spoke ends being seated in recesses in the fixed rim, comprising reducing the fixed rim from a larger to a smaller circumference on the spoke ends, the contracting force being exerted in segments of a circle about the entire circumference, except at the spoke ends.

5. A method of manufacturing wheels which comprise a plurality of spokes and a fixed rim, the spoke ends being seated in recesses in the fixed rim, comprising reducing the fixed rim from a larger to a smaller circumference on the spoke ends, by pressure exerted on the rim between the spoke ends, there being no pressure applied upon the spoke ends directly.

6. A method of manufacturing wheels which comprises the steps of forming a fixed rim larger than its finished circumference, forming a number of recesses in the fixed rim, assembling a plurality of spokes with tenons seated in the recesses and with butt ends in contacting relationship to form the hub, and contracting the fixed rim to a finished circumference by pressure applied on that part only of the fixed rim between spoke ends.

7. A method of manufacturing wheels comprising the steps of forming a fixed rim larger than its finished circumference, assembling a plurality of spokes with their butt ends in contact at the hub, and with the outer ends seated against the fixed rim and contracting the fixed rim to drive the butt ends of the spokes together to form the hub, but permitting the metal around the outer ends of the spokes to give, whereby tension is created in that portion of the fixed rim.

8. An apparatus for the uses and purposes set forth comprising a plurality of tire setter shoes adapted to encircle a wheel said shoes being provided with recesses in their inner faces corresponding in number to the spoke ends in the wheel.

9. An apparatus for compressing wheel rims, comprising a number of tire setter shoes arranged in a circle, said shoes being provided with recesses corresponding in number to the number of spokes in the wheel and adapted to receive the spoke ends without contacting the metal of the wheel rim about the spoke ends.

10. An apparatus for compressing wheel rims, comprising a number of tire setter shoes adapted to encircle a wheel, said shoes being provided with sockets in their inner faces, said sockets being of shape and size to relieve an area around the spoke ends of the pressure exerted by the shoes.

11. In an apparatus for use in the manufacture of wheels, a tire setter, said setter comprising a plurality of shoes arranged in a circle having sockets formed in the inner face of said shoes to house the spoke ends.

12. In an apparatus for use in the manufacture of wheels a tire setter, said setter comprising a compression shoe having a recess in the inner face of the shoe to house the spoke end.

13. In an apparatus for use in the manufacture of wheels, a tire setter, said setter comprising a plurality of compression shoes adapted to be arranged about the wheel, a shoe being provided with a recess in the inner face of each shoe to house a spoke end, and an inclined surface leading into said recess.

14. In an apparatus for use in the manufacture of wheels, a tire setter, said setter comprising a plurality of curved compression shoes, a number of recesses being provided in the inner faces of each of said shoes to house the spoke ends, said shoes having inclined surfaces around the edges of said recesses.

15. A tire setter comprising a plurality of arcuate setter shoes and ribs on the inner faces of the setter shoes adapted to enter between the flanges of a fixed wheel rim and bear upon the base of the rim.

16. A tire setter comprising a plurality of arcuate setter shoes, and a rib on the inner faces of the said shoes, adapted to enter between the flanges of a fixed wheel rim and bear upon the base of the rim, said rib being provided with a plurality of sockets to receive the spoke ends.

17. A tire setter comprising a plurality of arcuate setter shoes, and ribs on the inner faces of the said shoes, adapted to enter between the flanges of a fixed wheel rim and bear upon the base of the rim, said rim being provided with a plurality of sockets, said sockets being larger than the spoke ends and adapted to relieve the pressure from the metal rim about the spoke ends.

JOSEPH G. SWAIN.